US012109969B2

(12) United States Patent
Hwangbo et al.

(10) Patent No.: US 12,109,969 B2
(45) Date of Patent: Oct. 8, 2024

(54) AIRBAG CUSHION AND METHOD OF FOLDING THE SAME

(71) Applicant: HYUNDAI MOBIS CO., LTD., Seoul (KR)

(72) Inventors: Sang Won Hwangbo, Yongin-si (KR); Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/500,651

(22) Filed: Nov. 2, 2023

(65) Prior Publication Data
US 2024/0294137 A1 Sep. 5, 2024

(30) Foreign Application Priority Data
Mar. 3, 2023 (KR) .................. 10-2023-0028544

(51) Int. Cl.
*B60R 21/231* (2011.01)
*B60R 21/237* (2006.01)
*B60R 21/2338* (2011.01)

(52) U.S. Cl.
CPC ...... *B60R 21/23138* (2013.01); *B60R 21/237* (2013.01); *B60R 2021/23146* (2013.01); *B60R 21/2338* (2013.01); *B60R 2021/23386* (2013.01)

(58) Field of Classification Search
CPC ............ B60R 21/237; B60R 21/23138; B60R 2021/23146
See application file for complete search history.

(56) References Cited

U.S. PATENT DOCUMENTS

| 11,130,466 | B2 | 9/2021 | McKeon |
| 2006/0131847 | A1* | 6/2006 | Sato .................. B60R 21/23138 |
| | | | 280/730.2 |
| 2007/0284858 | A1* | 12/2007 | Nishimura ............ B60R 21/261 |
| | | | 280/729 |
| 2019/0218692 | A1* | 7/2019 | Kodera ..................... D03D 1/02 |
| 2023/0136525 | A1* | 5/2023 | Kawamura ....... B60R 21/23138 |
| | | | 280/730.2 |

FOREIGN PATENT DOCUMENTS

| DE | 102019124091 A1 * | 7/2020 | ............. B60R 21/16 |
| EP | 1867530 A1 * | 12/2007 | ........... B60R 21/207 |
| EP | 2390144 A1 * | 11/2011 | ........... B60R 21/213 |

(Continued)

*Primary Examiner* — Paul N Dickson
*Assistant Examiner* — Matthew D Lee
(74) *Attorney, Agent, or Firm* — NovoTechIP International PLLC

(57) ABSTRACT

The present invention provides an airbag cushion and a method of folding the same, in which the airbag cushion covers a lateral side and a front side of a seat by being deployed forward in a state in which the airbag cushion is folded at a lateral side of a seatback, a first lateral section of a lateral chamber, which is deployed from the lateral side of the seatback before the first lateral section reaches a passenger's shoulder, is folded by a tuck-in method that pushes the airbag cushion inward and folds the airbag cushion, and a second lateral section of the lateral chamber, which is deployed from the first lateral section while passing over the passenger's shoulder, is folded by an out-board roll method that folds the airbag cushion toward the outside of the passenger.

7 Claims, 6 Drawing Sheets

(56) References Cited

FOREIGN PATENT DOCUMENTS

| | | | |
|---|---|---|---|
| JP | 6089858 B2 | 3/2017 | |
| JP | 6356788 B2 | 7/2018 | |
| KR | 10-2013-0013975 B1 | 2/2013 | |
| WO | WO-2016031468 A1 * | 3/2016 | ........... B60R 21/207 |
| WO | WO-2019197164 A1 * | 10/2019 | ............. B60R 21/16 |

* cited by examiner

AIRBAG CUSHION AND METHOD OF FOLDING THE SAME

CROSS-REFERENCE TO RELATED APPLICATIONS

The present application claims priority to Korean Patent Application No. 10-2023-0028544, filed on Mar. 3, 2023, the entire contents of which are incorporated herein for all purposes by this reference.

TECHNICAL FIELD

The present invention relates to an airbag cushion having a folding structure improved to safely deploy an airbag without causing an injury to a passenger, and a method of folding the same.

BACKGROUND

In the case of an omnidirectional airbag that is deployed in a shape that covers lateral sides and a front side of a passenger, a lateral chamber is connected to a front chamber to constitute an airbag cushion.

The airbag cushions are folded at left and right sides of a seatback and deployed toward the front side of the passenger in the event of a collision of a vehicle.

Meanwhile, in the case of a side airbag in the related art, the airbag cushion is folded by an in-board folding method that folds the airbag cushion toward the passenger.

Because a forward/rearward length of the airbag cushion of the side airbag (in a forward/rearward direction of the passenger) is relatively short, the airbag cushion may be stably deployed even when a front end of the airbag cushion interferes with the passenger's shoulder.

However, a forward/rearward length of the airbag cushion of the omnidirectional airbag cushion is relatively long. For this reason, in case that the airbag cushion of the omnidirectional airbag cushion is folded by the in-board folding method like the side airbag cushion, the airbag cushion may be deployed between the passenger's back and the seat or the airbag cushion may strongly push the passenger's shoulder forward, which may cause an injury to the passenger.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide an airbag cushion having a folding structure improved to safely deploy an airbag without causing an injury to a passenger, and a method of folding the same.

An exemplary embodiment of the present invention provides an airbag cushion, which covers a lateral side and a front side of a seat by being deployed forward in a state in which the airbag cushion is folded at a lateral side of a seatback, in which a first lateral section of the airbag cushion, which is deployed from the lateral side of the seatback before the first lateral section reaches a passenger's shoulder, is folded by a tuck-in method that pushes the airbag cushion inward and folds the airbag cushion, and a second lateral section of the airbag cushion, which is deployed from the first lateral section while passing over the passenger's shoulder, is folded by an out-board roll method that folds the airbag cushion toward the outside of the passenger.

A third lateral section of the airbag cushion, which is deployed forward from the second lateral section, may be folded by the in-board roll method that folds the airbag cushion toward the passenger.

A front section of the airbag cushion, which is deployed laterally from the third lateral section, may be folded by the tuck-in method that pushes the airbag cushion inward and folds the airbag cushion.

An exemplary embodiment of the present invention provides a method of folding an airbag cushion that covers a lateral side and a front side of a seat by being deployed forward in a state in which the airbag cushion is folded at a lateral side of a seatback, the method including: a first lateral section folding step of folding a first lateral section of the airbag cushion, which is deployed from the lateral side of the seatback before the first lateral section reaches the passenger's shoulder, by a tuck-in method that pushes the airbag cushion inward and folds the airbag cushion; and a second lateral section folding step of folding a second lateral section of the airbag cushion, which is deployed from the first lateral section while passing over the passenger's shoulder, by an out-board roll method that folds the airbag cushion toward the outside of the passenger.

The method may include a third lateral section folding step of folding a third lateral section of the airbag cushion, which is deployed forward from the second lateral section, by an in-board roll method that folds the airbag cushion toward the passenger.

The method may include a front section folding step of folding a front section of the airbag cushion, which is deployed laterally from the third lateral section, by the tuck-in method that pushes the airbag cushion inward and folds the airbag cushion.

The airbag cushion may be folded in the order of the front section, the third lateral section, the second lateral section, and the first lateral section.

According to the technical solutions of the present invention, the section of the lateral chamber, which is deployed before the airbag cushion reaches the passenger's shoulder, is folded by the tuck-in method, thereby improving the performance in deploying the airbag cushion and increasing the deployment speed.

In particular, the section of the lateral chamber, which is deployed so that the airbag cushion passes over the passenger's shoulder, is folded by the out-board roll method, such that the airbag cushion is prevented from striking the passenger's shoulder from behind, thereby safely and quickly deploying the airbag without causing an injury to the passenger.

Moreover, the section of the lateral chamber of the airbag cushion, which is deployed after passing over the passenger's shoulder, is folded by the in-board roll method, and the section of the front chamber, which is deployed at the front side of the passenger, is folded by the tuck-in method, such that the front chamber is accurately and quickly deployed at the front side of the passenger.

DETAILED DESCRIPTION

Figure 1:
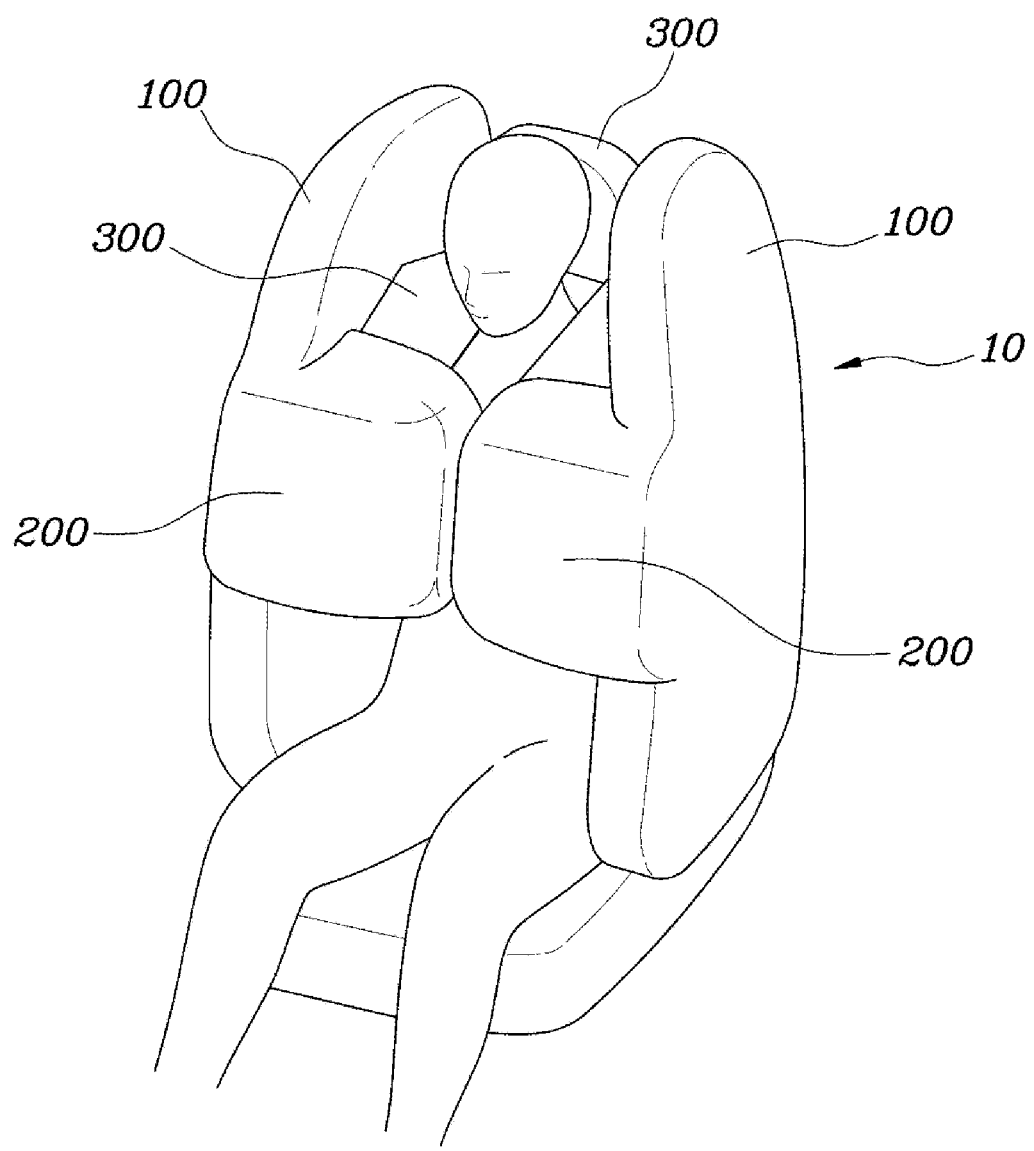
FIG. 1 is a view illustrating a deployed shape of an airbag cushion according to the present invention.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, exemplary embodiments of the present invention will be described in detail with reference to the accompanying drawings.

With reference to FIG. 1, an airbag cushion 10 according to the present invention includes a lateral chamber 100 configured to be deployed in a shape that covers a lateral side of a seat, and a front chamber 200 configured to be deployed in a shape that covers a front side of the seat.

The lateral chamber 100 is deployed to be elongated in an upward/downward longitudinal direction while being deployed forward from a left or right side of a seatback 20.

The lateral chamber 100 is deployed to a space between a passenger and a vehicle structure such as a door and a center console and protects the passenger's head, shoulder, chest, abdomen, and pelvis that are main parts of the lateral side of the passenger.

The front chambers 200 are respectively connected to front ends of the lateral chambers 100 disposed at the left and right sides and configured to be deployed in shapes shape bent toward the front side of the passenger.

The front chamber 200 is deployed to protect a region from the passenger's shoulder to the passenger's abdomen.

Further, an upper end tether 300 having a planar shape is connected to an upper end of the front chamber 200, an inner surface of the lateral chamber 100 connected to the upper end of the front chamber 200, and a seat back frame at an upper end of the seatback 20.

Therefore, the upper end tethers 300 are deployed while passing over the shoulders of the passenger and serve to support a load of the passenger while restricting deployment shapes of the upper ends of the airbag cushions 10.

Further, a lower end tether (not illustrated) having a planar shape is connected to a lower end of the front chamber 200, the inner surface of the lateral chamber 100 connected to the lower end of the front chamber 200, and the seat back frame at a lower end of the seatback 20.

Therefore, the lower end tethers are deployed while passing over the thighs of the passenger and serve to support a load of the passenger while restricting deployment shapes of the lower ends of the airbag cushions 10.

Meanwhile, the airbag cushions 10 of the present invention are respectively folded at the left and right sides of the seatback 20.

Figure 2:
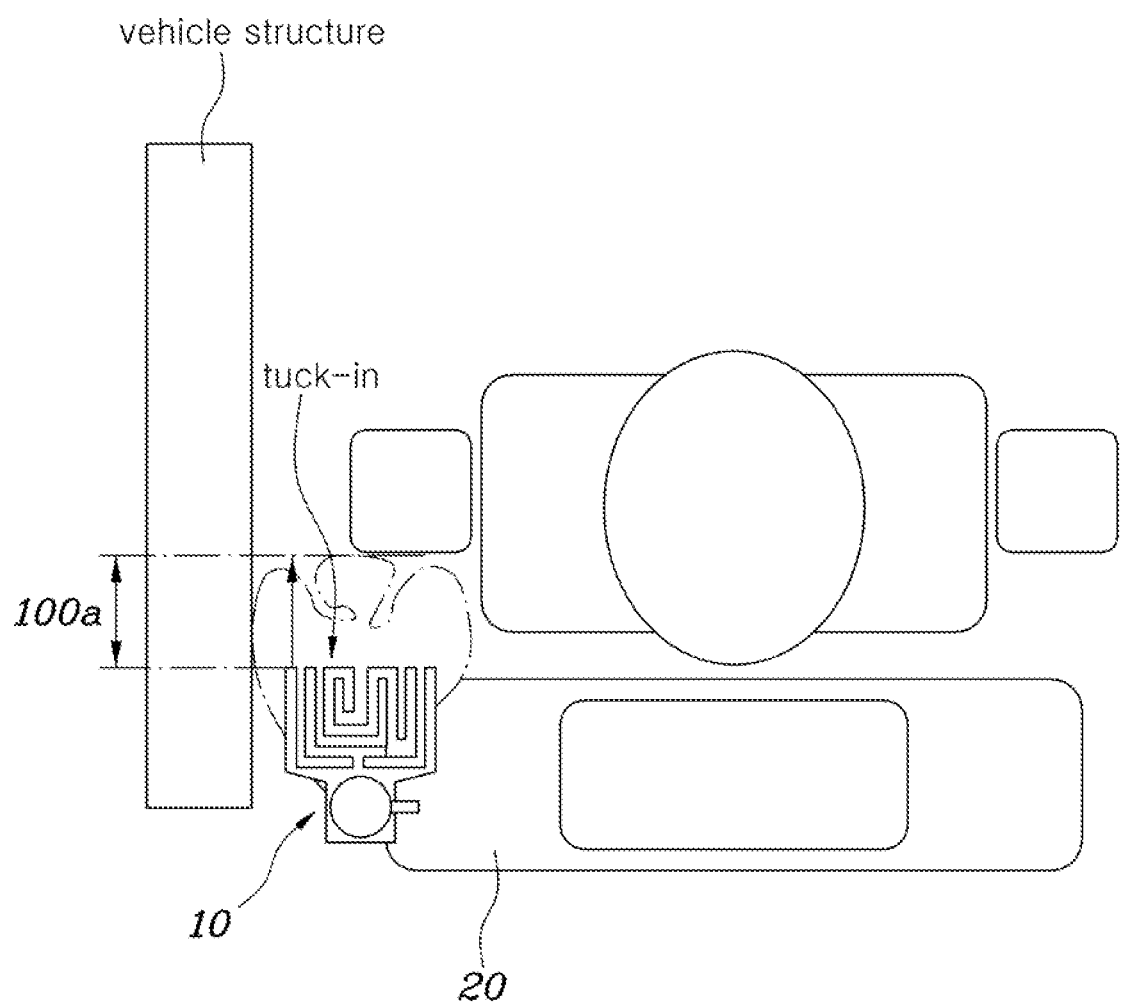
FIG. 2 is a view for explaining an operation of deploying a first lateral section of an airbag cushion according to the present invention.
Figure 3:
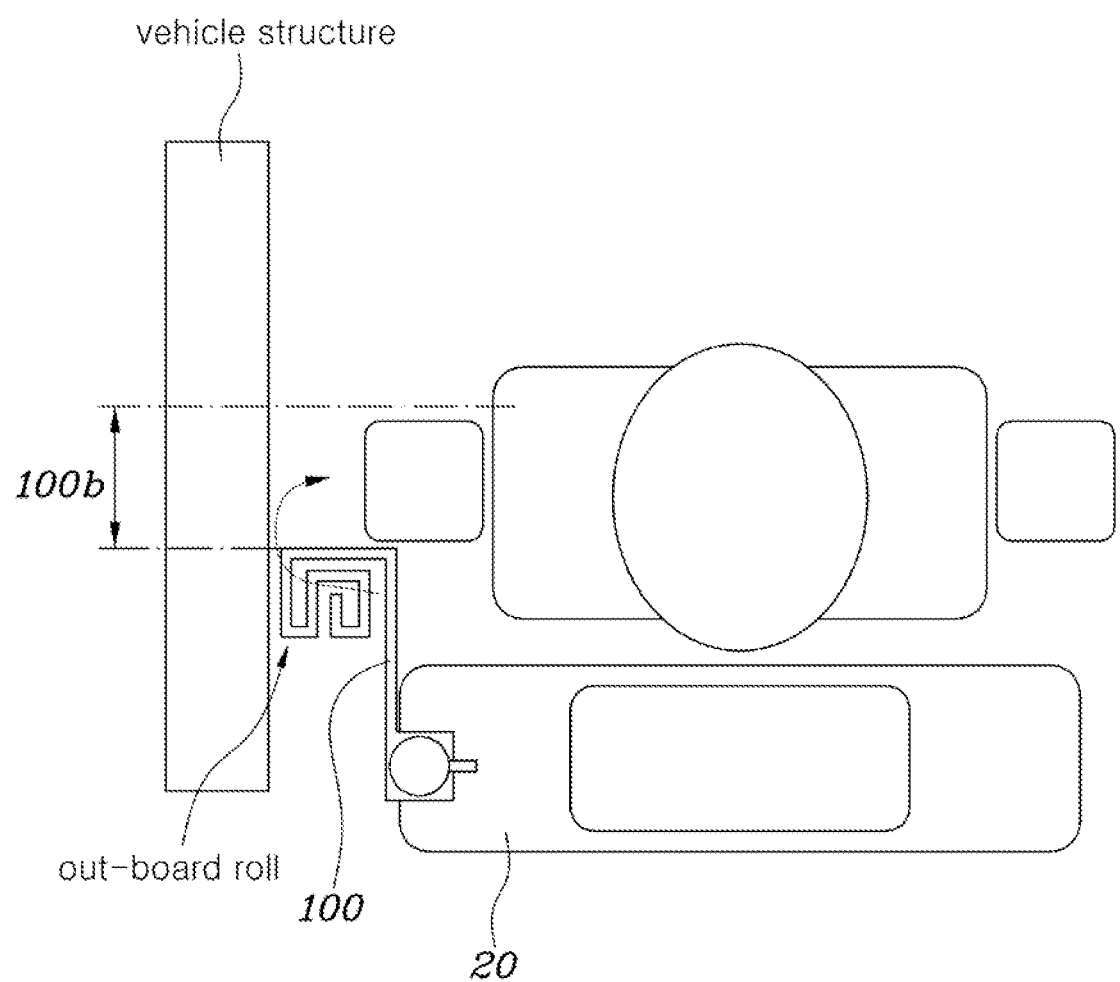
FIG. 3 is a view for explaining an operation of deploying a second lateral section of the airbag cushion according to the present invention.

With reference to FIGS. 2 and 3, the present invention relates to the airbag cushion 10 configured to cover the lateral side and the front side of the seat by being deployed forward in a state in which the airbag cushion 10 is folded at the lateral side of the seatback 20. A first lateral section 100a of the lateral chamber 100, which is deployed from the lateral side of the seatback 20 without reaching the passenger's shoulder, may be folded by a tuck-in method that pushes the airbag cushion 10 inward and folds the airbag cushion 10. A second lateral section 100b of the lateral chamber 100, which is deployed from the first lateral section 100a while passing over the passenger's shoulder, may be folded by an out-board roll method that folds the airbag cushion 10 toward the outside of the passenger.

In this case, the airbag cushion 10, which is folded in the first lateral section 100a, may be tucked in and folded one or more times.

Further, the airbag cushion 10, which is folded in the second lateral section 100b, may be folded to be rolled in a roll shape toward vehicle structures such as a door and a center console by the out-board roll method.

That is, when the airbag cushion 10 is deployed forward from the lateral side of the seatback 20, the first lateral section 100a is folded by the tuck-in method, such that the deployment directionality of the airbag cushion 10 is guided to a rectilinear direction before the airbag cushion 10 reaches the passenger's shoulder, thereby improving the performance in deploying the airbag cushion 10, increasing a deployment speed of the first lateral section 100a, and more quickly deploying the airbag cushion 10.

In addition, the second lateral section 100b, which is deployed from a portion immediately before the passenger's shoulder while passing over the shoulder, is folded by the out-board roll method, such that the airbag cushion 10 is guided to be deployed forward while passing over an outer portion of the passenger's shoulder.

Therefore, the airbag cushion 10 is prevented from striking the passenger's shoulder from behind when the airbag cushion 10 is deployed, such that the airbag is safely deployed without causing an injury to the passenger.

In addition, the airbag cushion 10 does not interfere with the passenger's shoulder, such that the airbag cushion 10 is prevented from being abnormally deployed, thereby improving the performance in deploying the airbag cushion 10.

Figure 4:
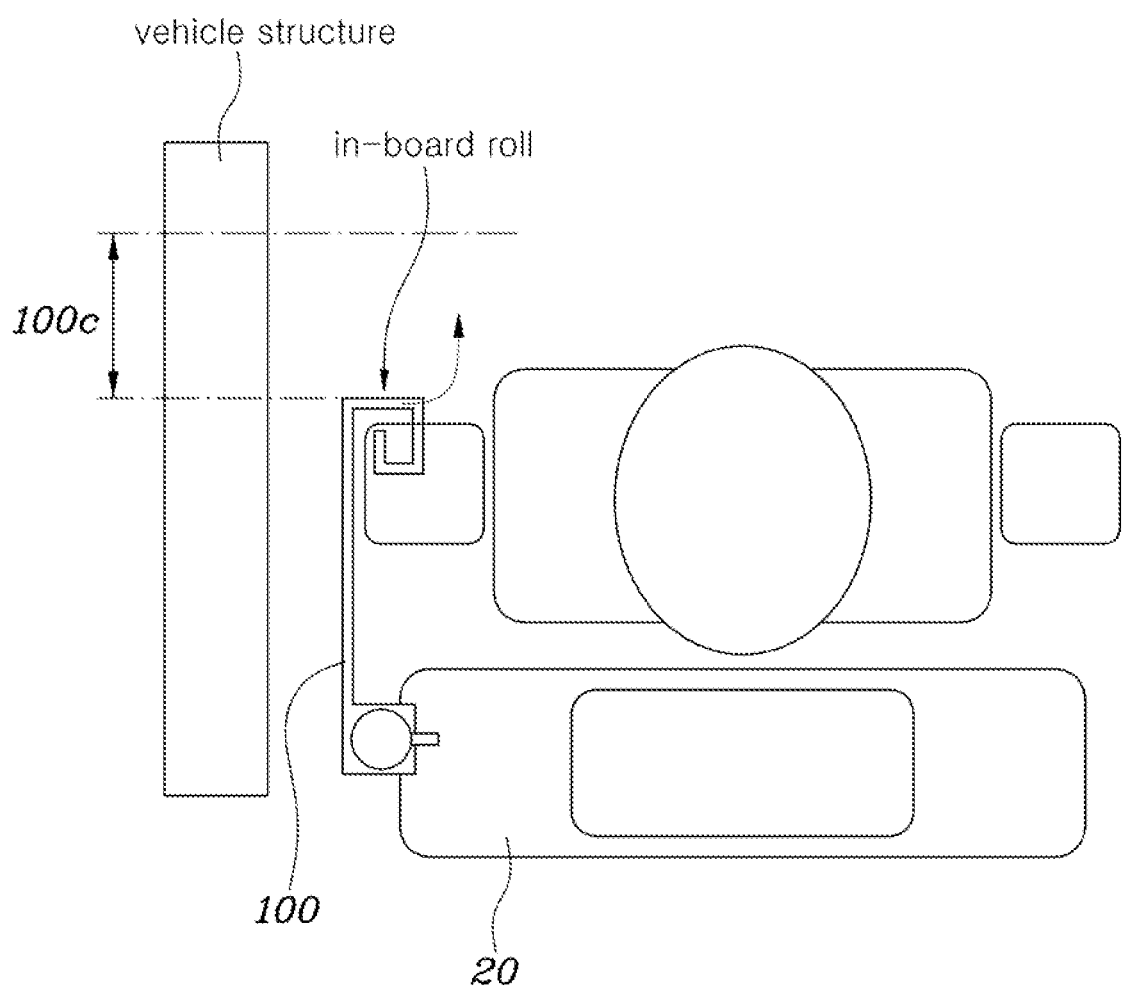
FIG. 4 is a view for explaining an operation of deploying a third lateral section of the airbag cushion according to the present invention.

Further, with reference to FIG. 4, a third lateral section 100c of the lateral chamber 100, which is deployed forward from the second lateral section 100b, may be folded by an in-board roll method that folds the airbag cushion 10 toward the passenger.

That is, the airbag cushion 10, which is folded in the third lateral section 100c, is folded in a roll shape rolled toward the passenger seated in the seat by the in-board roll method.

Therefore, after the airbag cushion 10 moves from a position behind the passenger's shoulder to a position in front of the shoulder, the airbag cushion 10 is deployed toward the inside of the passenger by the in-board roll folding, such that the front chamber 200 connected to the second lateral section 100b may be quickly positioned at the position in front of the passenger.

Figure 5:
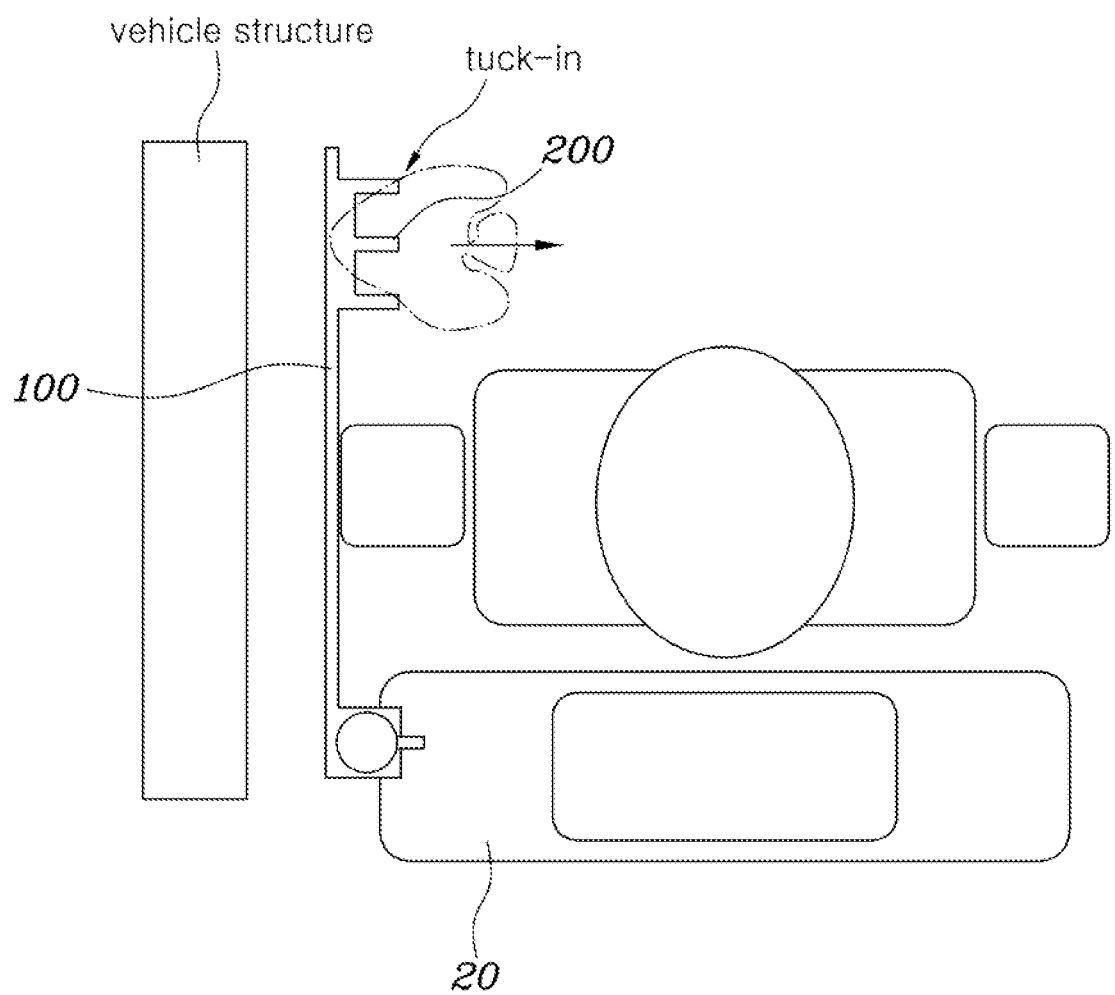
FIG. 5 is a view for explaining an operation of deploying a front section of the airbag cushion according to the present invention.

Further, with reference to FIG. 5, the front chamber 200, which is deployed laterally from the third lateral section 100c, may be folded by the tuck-in method that pushes the airbag cushion 10 inward and folds the airbag cushion 10.

The front chamber 200 is the chamber configured to be deployed at the front side of the passenger. The front chamber 200 of the airbag cushion 10 may be tucked in and folded one or more times.

That is, because the front chamber 200 is folded by the tuck-in method, the deployment directionality of the front chamber 200 is guided so that the front chamber 200 is deployed at the front side of the passenger, thereby improving the performance in deploying the airbag cushion 10, increasing the deployment speed of the front chamber 200, and more quickly deploying the airbag cushion 10.

Figure 6:
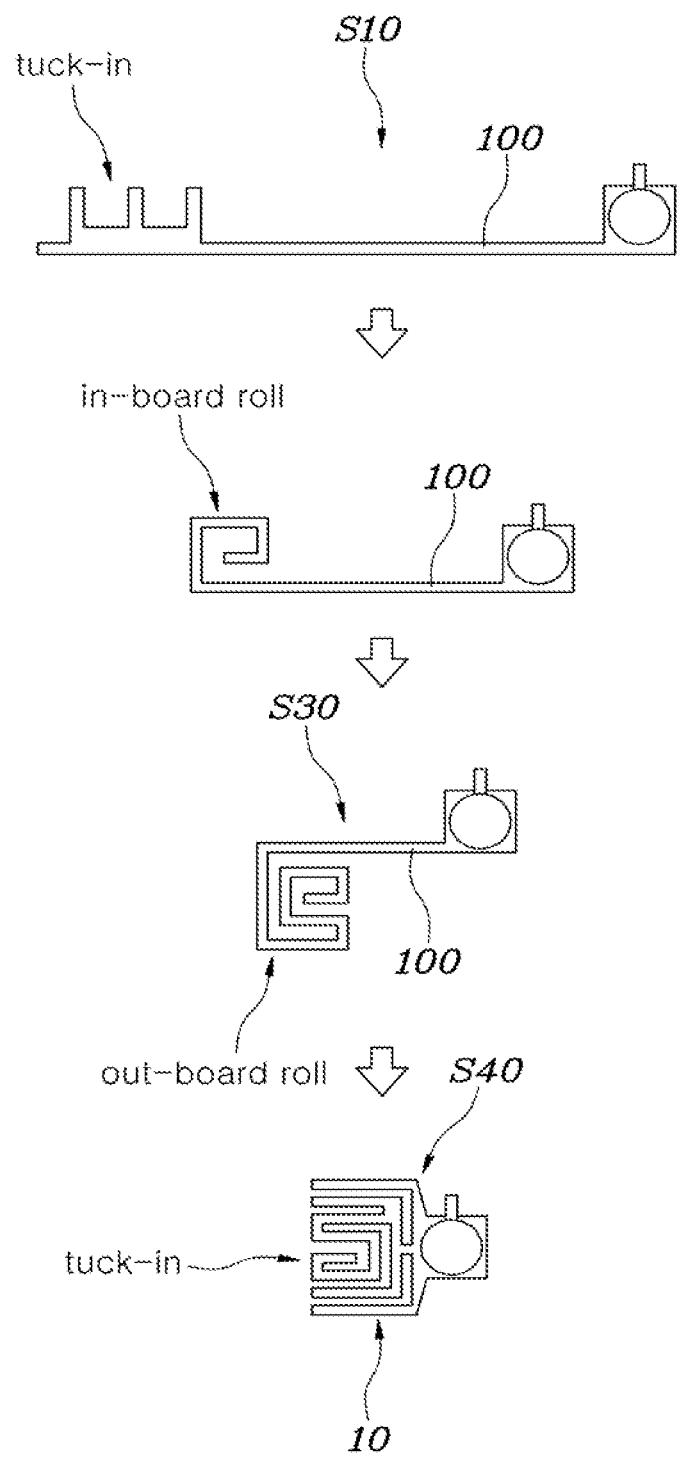
FIG. 6 is a view sequentially illustrating steps of folding the airbag cushion according to the present invention.

Meanwhile, with reference to FIG. 6, a method of folding the airbag cushion 10 according to the present invention is a method of folding the airbag cushion 10 configured to cover the lateral side and the front side of the seat by being deployed forward in the state in which the airbag cushion 10 is folded at the lateral side of the seatback 20. The method includes a first lateral section folding step S10 of folding the first lateral section 100a of the lateral chamber 100, which is deployed from the lateral side of the seatback 20 without reaching the passenger's shoulder, by the tuck-in method that pushes the airbag cushion 10 inward and folds the airbag cushion 10, and a second lateral section folding step S20 of folding the second lateral section 100b of the lateral chamber 100, which is deployed from the first lateral section 100a while passing over the passenger's shoulder, by the out-board roll method that folds the airbag cushion 10 toward the outside of the passenger.

Further, the method may include a third lateral section folding step S30 of folding the third lateral section 100c of the lateral chamber 100, which is deployed forward from the second lateral section 100b, by the in-board roll method that folds the airbag cushion 10 toward the passenger.

In addition, the method may include a front chamber folding step S40 of folding the front chamber 200, which is deployed laterally from the third lateral section 100c, by the tuck-in method that folds the airbag cushion 10 inward and folds the airbag cushion 10.

In particular, the airbag cushion 10 may be folded in the order of the front chamber 200, the third lateral section 100c, the second lateral section 100b, and the first lateral section 100a.

The process of folding the airbag cushion 10 will be described. The airbag cushion 10 is folded once by the tuck-in method that pushes an end of the front chamber 200, which is deployed at the front side of the passenger, inward toward the lateral chamber 100.

Next, the third lateral section 100c is folded by the in-board roll method so that the front end of the lateral chamber 100, which is deployed in the third lateral section 100c together with the portion folded by the tuck-in method, may be folded to be rolled toward the passenger.

Further, the second lateral section 100b is folded by the out-board roll method so that a middle portion of the lateral chamber 100, which is connected to the third lateral section 100c and deployed in the second lateral section 100b, may be folded to be rolled in a direction opposite to the passenger.

Thereafter, a rear end of the lateral chamber 100, which is connected to the second lateral section 100b and deployed in the first lateral section 100a, is folded twice by the tuck-in method that pushes the airbag cushion toward the inflator, such that the process of folding the airbag cushion 10 is completed.

As described above, according to the present invention, the section of the lateral chamber 100 of the airbag cushion 10, which is deployed before the section of the lateral chamber 100 reaches the passenger's shoulder, is folded by the tuck-in method, thereby improving the performance in deploying the airbag cushion 10 and increasing the deployment speed. In particular, the section of the lateral chamber 100 of the airbag cushion 10, which is deployed while passing over the passenger's shoulder, is folded by the out-board roll method, such that the airbag cushion 10 is prevented from striking the passenger's shoulder from behind, thereby safely and quickly the airbag without causing an injury to the passenger.

Moreover, the section of the lateral chamber 100 of the airbag cushion 10, which is deployed after passing over the passenger's shoulder, is folded by the in-board roll method, and the section of the front chamber 200, which is deployed at the front side of the passenger, is folded by the tuck-in method, such that the front chamber 200 is accurately and quickly deployed at the front side of the passenger.

While the present invention has been described with reference to the specific examples, it is apparent to those skilled in the art that various modifications and alterations may be made within the technical spirit of the present invention, and these modifications and alterations belong to the appended claims.

What is claimed is:

1. An airbag cushion stored folded at a lateral side of a seatback of a seat and configured to, when inflated, deploy forward to cover lateral and front sides of the seat, the airbag cushion including a lateral chamber divided into a plurality of lateral sections including:

a first lateral section stored tucked-in to push the airbag cushion inwardly and configured to, when deployed, extend forward from the lateral side of the seatback without reaching a shoulder of a passenger seated at the seat, and a second lateral section stored out-board rolled to fold the airbag cushion away from the passenger and configured to, when deployed, extend forward from the first lateral section and beyond the passenger's shoulder.

2. The airbag cushion of claim 1, wherein the plurality of lateral sections further includes a third lateral section stored in-board rolled to fold the airbag cushion toward the passenger and configured to, when deployed, extend forward from the second lateral section.

3. The airbag cushion of claim 2, wherein the airbag cushion further includes a front chamber stored tucked in to push the airbag cushion inwardly and configured to, when deployed, extend laterally from the third lateral section.

4. A method of folding an airbag cushion stored at a lateral side of a seatback of a seat, the airbag cushion configured to, when inflated, deploy forward to cover lateral and front sides of the seat and comprising a lateral chamber divided into a plurality of lateral sections including (1) a first lateral section configured to, when deployed, extend forward from the lateral side of the seatback without reaching a shoulder of a passenger seated at the seat and (2) a second lateral section configured to, when deployed, extend forward from the first lateral section and beyond the passenger's shoulder, the method comprising:

a first folding step of tucking-in the first lateral section to push the airbag cushion inwardly; and a second folding step of out-board rolling the second lateral section to fold the airbag cushion away from the passenger.

5. The method of claim 4, wherein:

the plurality of lateral sections of the lateral chamber further includes a third lateral section configured to, when deployed, extend forward from the second lateral section, and the method further comprises a third folding step of in-board rolling the third lateral section to fold the airbag cushion toward the passenger.

6. The method of claim 5, wherein:

the airbag cushion further comprises a front chamber configured to, when deployed, extend laterally from the third lateral section, and the method further comprises tucking-in the front chamber to push the airbag cushion inwardly.

7. The method of claim 6, wherein the airbag cushion is folded in an order of the front chamber, the third lateral section, the second lateral section, and the first lateral section.

* * * * *